United States Patent Office 3,535,252
Patented Oct. 20, 1970

3,535,252
ADHESIVE COMPOSITION
Frank J. Allen, Solihull, England, assignor to Bakelite Xylonite Limited, a British company
No Drawing. Filed Dec. 30, 1966, Ser. No. 606,038
Claims priority, application Great Britain, Sept. 29, 1964, 39,633/64
Int. Cl. C08c 1/22; C08g 51/28
U.S. Cl. 260—33.6
23 Claims

ABSTRACT OF THE DISCLOSURE

An adhesive composition for uniting mold parts made of sand and resin binder. The adhesive composition includes (a) a phenolic or urea resin, (b) an oil having a boiling point above 150° C., and (c) a thixotropic agent containing silica or magnesium montmorillonite.

---

The present invention relates to a novel adhesive composition, and in particular to a thermosetting adhesive composition suitable for uniting composite parts of molds and cores comprising sand and a synthetic resin.

It is known to provide a method for uniting the composite parts of a mold or mold core as defined, which method comprises applying to one or more of the mating surfaces of the composite parts of the mold or mold core, an adhesive comprising a mixture of a powdered synthetic thermosetting resin and a liquid having a boiling point greater than 150° C. which is not a solvent for the resin at the temperature at which it is hardened, bringing the composite parts together to form the mold or mold core, and allowing the adhesive to harden.

The above adhesives desirably employ a high resin content; for example, roughly equal quantities of mineral oil and powdered resin are used to produce a preferred stable adhesive.

The viscous nature of such an adhesive, resulting from a high resin content; (a) prevents spread and consequent pre-cure of the adhesive on the hot mold; and (b) prevents undue separation of the resin/oil composition on prolonged standing, but this viscous nature is, to some extent, detrimental to the actual application of the adhesive to a mold half by conventional extrusion techniques, for example, with a grease gun, or an icing gun.

Accordingly, it is an object of the present invention to reduce the viscosity of the above resin adhesive without detriment to the binding properties thereof.

This and other objects are accomplished in the present invention which provides a thermosetting adhesive composition comprising a mixture of a powdered thermosetting resin, a liquid having a boiling point greater than 150° C. which is a non-solvent for the resin at the temperature at which the resin is hardened and a thixotropic agent in an amount to confer thixotropic properties on the composition.

It has now been found that the resin content of such a resin adhesive can be reduced without detriment to its binding properties by the incorporation of a thixotropic agent.

There are a number of types of synthetic thermosetting resins which are suitable as adhesives for the purposes of this invention, but the phenolic resins are preferred because, unlike e.g. urea resins, they do not give off objectionable fumes when being cured. The most preferred phenolic resins are those based on phenol, cresol or xylenol and formaldehyde including the novolac resins obtained by condensing phenol with formaldehyde in acid solution and the resole resins obtained by condensing phenol with formaldehyde in alkaline solution or a combination of novolacs and resoles.

The resin is preferably present in an amount of from 30 to 35% by weight of the total composition. The resin content can, however be varied over a wide range, for example from 5 to 45% by weight; generally, no advantage is gained by using amounts in excess of 45% and with smaller quantities, such as 5%, a larger amount of adhesive is necessary to obtain an acceptable bond.

The preferred high boiling point liquids are oils which do not give off obnoxious fumes at the curing temperature, e.g. mineral lubricating oils, electrical insulating oils or liquid paraffin.

By the term "thixotropic agent" as used herein is meant an agent which will (a) prevent or substantially reduce separation of the resin/oil mixture; and (b) confer "shape retention" on the composition, i.e., the composition has, due to thixotropy, a resultant viscosity such that there is very little spread on, for example, a hot mold.

It has been found that adhesive compositions with the degree of thixotropy consistent with non-separation of the resin/liquid mixture and having acceptable flow properties and shape retention as an extrudate have viscosities in the range 10,000 cps. to 100,000 cps. at 1.5 r.p.m. and for the same materials 1,200 cps. to 9,000 cps. at 60 r.p.m., all measurements being made at 25° C. on a Brookfield synchro electric viscometer using a No. 4 spindle. The upper limit at 60 r.p.m. depends to a certain extent on the method of application, i.e. on the applicator; if the latter is hand operated it is preferable to use thinner compositions but if it is power operated thicker compositions may be used. Preferably the viscosity should not be above 70,000 cps. at 1.5 r.p.m. and 4,500 cps. at 60 r.p.m.

The thixotropy of the adhesive composition is dependent mainly on the viscosity of the liquid carrier, a practical range being of the order 100–300 cps., and the thixotropic agent. The preferred thixotropic agents are those which contain silica made by the pyrolysis of silicon tetrachloride. Suitable thixotropic agents are shown in the following table:

TABLE I

| | |
|---|---|
| Aerosil (SiO$_2$) | Made by pyrolysis of silicon tetrachloride. |
| Santocel Z (R.T.M.) | Silica aerogel. |
| Sylodex | Finely divided silica powder. |
| Bentone 38 | An organic derivative of magnesium montmorillonite. |

Of the products shown in the table, Aerosil is preferred.

The amount of thixotropic agent which is effective varies in each case, but falls within the range 0.1–4% by weight of the total composition. For aerosil 0.5–1.0% is preferred. Bentone 38 is ineffective alone and should be used in conjunction with one third of its weight of substance containing hydroxyl groups, e.g. aliphatic alcohols having 1 to 10 carbon atoms, methanol or industrial methylated spirits and the like and aromatic alcohols having 1 to 20 carbon atoms such as benzyl alcohol and the like. About 1.5% of such a mixture is suitable.

Adhesives in accordance with the invention have the advantage that the cure time can be varied with the particle size of the resin in the adhesive. Resin having a small particle size such that, for example, not less than 99% passes a 200 mesh screen, cures at an acceptable rate at temperatures (i.e. about 170° C.) normally associated with silica sand molds which have a relatively low specific heat. At higher temperatures (e.g. about 230° C.), such as those encountered in zircon sand molds, which have a much greater specific heat than do silica sand molds, resin of such particle size would cure far too rapidly. In this case more coarsely ground resin, for example that produced by a pin disc mill and having a sieve analysis of the order 10% retention on a 60 mesh screen and 40% on a 200 mesh screen (these figures being cumulative) provides an acceptable cure rate.

Within the limits of thixotropy which are acceptable for the purpose of the invention, the quantity and particle size of the resin have been found to have only a marginal effect on the thixotropic properties of the adhesive. For example adhesive compositions according to the invention containing respectively (1)

| | Parts by wt. |
|---|---|
| Mineral lubricating oil | 90 |
| Novolac | 45 |
| Hexamine | 5 |
| Aerosil | 1.5 |

(2)

| | |
|---|---|
| Mineral lubricating oil | 90 |
| Novolac | 18 |
| Hexamine | 2 |
| Aerosil | 1.5 | have thixotropic properties (as measured on the Brookfield Viscometer at 25° C. using a number 4 spindle) of 52,000 cps. and 44,000 cps. respectively at 1.5 r.p.m. and 3,750 cps. and 2,350 cps. respectively at 60 r.p.m. Similarly, composition (1) above, in which the resin is (a) ground in a mill, (b) micronized, has thixotropic properties (measured in the same way) of (a) 22,000 cps. and (b) 22,500 cps. at 6 r.p.m.

The invention also includes a method for uniting the composite parts of a mold or mold core which method comprises applying to one or more of the mating surfaces of the composite parts of the mold an adhesive composition in accordance with the invention, bringing the composite parts together to form the mold or mold core, and allowing or causing the adhesive to harden or cure. The adhesive may be applied by means of an extruding device.

The invention also includes molds or mold cores when prepared by the method of the invention, and mold comprising composite parts which have been prepared by any method known per se and which have been united by the use of an adhesive in accordance with the invention.

The following is a description by way of examples of the compositions of the present invention and their use. The novolac employed in the examples was produced by reacting phenol with formaldehyde (in a 1/0.85 mole ratio) in the presence of hydrochloric acid catalyst. All parts and percentages are by weight unless otherwise indicated.

EXAMPLE 1

An adhesive paste was prepared according to the following formulation:

| | Parts by wt. |
|---|---|
| Mineral lubricating oil (viscosity of 117 cps. at 25° C. boiling point 260° C.) | 180 |
| Aerosil | 4 |
| Novolac (phenol formaldehyde novolac)—screen analysis 10% retention on a 60 mesh screen, 40% on a 200 mesh screen | 90 |
| Hexamine (hexamethylenetetramine) | 10 |

The aerosil was added to the oil and mixed in a high speed stirrer, and when the aerosil had been completely wetted, the novolac and hexamine were added and mixing continued until homogeneous.

The resultant paste had the following viscosities, when measured with a Brookfield synchro electric viscometer with a No. 4 spindle at the stated speeds.

| Speed, r.p.m.: | Viscosity, cps. at 25° C. |
|---|---|
| 1.5 | 70,000 |
| 60 | 4,500 |

A ribbon of the paste ³⁄₁₆″ diameter was applied by means of a grease gun to the joining surface of a zircon sand shell mold half, the mating half placed in position and the assembled mold placed in a suitable closer, such as a vacuum bag closer or a pin closer, and pressure applied for 30 seconds. The temperature of both shell mold halves was 220° C. A satisfactory mold was produced.

When a novolac resin, finely ground such that 99% passed a 200 mesh screen, was used, the composition was found to be suitable for silica sand molds, the same procedure being used as for the zircon sand mold.

EXAMPLE 2

An adhesive paste was prepared according to the following formulation:

| | Parts by wt. |
|---|---|
| Mineral lubricating oil (viscosity of 117 cps. at 25° C. boiling point 260° C.) | 90 |
| Aerosil | 1.5 |
| Novolac (phenol formaldehyde novolac)—screen analysis 10% retention on a 60 mesh screen, 40% on a 200 mesh screen | 36 |
| Hexamine (hexamethylenetetramine) | 4 |

These components were mixed in the same manner as in Example 1 except in that the novolac and hexamine are added as a mixture which has been finely ground such that 99% passed a 200 mesh screen.

The viscosity of the mixture was measured as in Example 1 and the following results obtained:

| Speed, r.p.m.: | Viscosity, cps. at 25° C. |
|---|---|
| 1.5 | 43,000 |
| 60 | 2,400 |

The paste was found suitable for bonding silica sand shell mold halves when the method of Example 1 was used, the temperature of the mold halves being within the range 170–205° C.

EXAMPLE 3

An adhesive paste was prepared according to the following formulation:

| | Parts by wt. |
|---|---|
| Mineral lubricating oil (viscosity of 117 cps. at 25° C. boiling point 260° C.) | 90 |
| Aerosil | 1.5 |
| Novolac (phenol formaldehyde novolac)—screen analysis 10% retention on a 60 mesh screen, 40% on a 200 mesh screen | 18 |
| Hexamine | 2 |

The components were mixed in the manner described in Example 2, and the viscosity measured in the same way to give the following results.

| Speed, r.p.m.: | Viscosity, cps. at 25° C. |
|---|---|
| 1.5 | 44,000 |
| 60 | 2,400 |

The adhesive was found to be suitable for bonding silica sand shell mold halves in accordance with the method of Example 2.

What is claimed is:

1. A thermosetting adhesive composition comprising a mixture of (a) 5 to 45% by weight of said composition of a powdered resin selected from the group consisting of phenolic resins and urea resins, (b) 94.9 to 54.9% by weight of a hydrocarbon oil having a boiling point greater than 150° C. which is a non-solvent for said resin at the temperature at which said resin is hardened, (c) 0.1 to 4.7% by weight of said composition of a thixotropic agent selected from the group consisting of (a) silica or (b) the reaction product of a magnesium montmorillonite and an aliphatic alcohol having 1 to 3 carbon atoms and (d) a hardener for said composition.

2. A composition as claimed in claim 1 wherein the viscosity of the composition is in the range 10,000 cps. to 100,000 cps. at 1.5 r.p.m. and 1,200 cps. to 9,000 cps. at 60 r.p.m., as measured at 25° C. on a Brookfield synchro electric viscometer using a No. 4 spindle.

3. A composition as claimed in claim 1 wherein the viscosity of the composition is below 70,000 cps. at 1.5 r.p.m. and 4,500 cps. at 60 r.p.m., as measured at 25° C. on a Brookfield synchro electric viscometer using a No. 4 spindle.

4. A composition as claimed in claim 1 wherein the resin is selected from the group consisting of phenol, cresol and xylenol with formaldehyde resins.

5. A composition as claimed in claim 1 wherein the resin is a phenol-formaldehyde resin.

6. A composition as claimed in claim 1 wherein the resin is a urea-formaldehyde resin.

7. A composition as claimed in claim 1 wherein the resin is present in an amount of from 30 to 35% by weight of the total composition.

8. A composition as claimed in claim 1 wherein said oil has a viscosity of 100–300 cps. as measured at 25° C. on a Brookfield viscometer using a No. 4 spindle.

9. A composition as claimed in claim 1 wherein said oil is an electrical insulating oil.

10. A composition as claimed in claim 1 wherein said oil is a mineral oil.

11. A composition as claimed in claim 1 wherein the oil is a liquid paraffin.

12. A composition as claimed in claim 1 wherein the silica in said silica containing agent is selected from the group consisting of silica made by the pyrolysis of silica tetrachloride, silica aerogel and silica powder.

13. The composition of claim 1 wherein said thixotropic agent is an organic derivative of magnesium montmorillonite and methanol in a weight ratio of about 3 to 1 of derivative to methanol.

14. A composition as claimed in claim 1 wherein the thixotropic agent is present in an amount of from 0.5 to 2.0% by weight of the total composition.

15. A method for uniting the composite parts of a mold or mold core which method comprises applying to one or more of the mating surfaces of the composite parts of the mold the adhesive composition of claim 1, applying heat and bringing the composite parts together to form the mold or mold core, and allowing the adhesive to harden.

16. A method as claimed in claim 15 wherein the mold core comprises zircon sand and a binding agent.

17. A method as claimed in claim 15 wherein the binding agent is a synthetic thermosetting resin.

18. A method as claimed in claim 15 wherein the binding agent is a phenol-formaldehyde resin.

19. A method as claimed in claim 15 wherein the mold or mold core comprises silica sand and a binding agent.

20. A method as claimed in claim 19 wherein the particle size of the resin contained in the adhesive is such that at least 99% passes a 200 mesh screen.

21. A mold comprising mold parts which are adhered together by the thermosetting adhesive composition of claim 1.

22. The mold of claim 21 wherein said mold parts comprise silica sand and a binding agent.

23. The mold of claim 21 wherein said mold parts comprise zircon sand and a binding agent.

References Cited

FOREIGN PATENTS 798,915    7/1958    Great Britain.
668,412    8/1963    Canada.

OTHER REFERENCES

Salzberg et al., Modern Castings, July 1960, pp. 101–110.

MORRIS LIEBMAN, Primary Examiner

L. T. JACOBS, Assistant Examiner

U.S. Cl. X.R.

260—38, 39